United States Patent
Howard et al.

(10) Patent No.: US 7,284,272 B2
(45) Date of Patent: Oct. 16, 2007

(54) SECRET HASHING FOR TCP SYN/FIN CORRESPONDENCE

(75) Inventors: Brett Howard, Nepean (CA); Jean-Marc Robert, Ottawa (CA); Paul Kierstead, Ottawa (CA); Scott David D'Souza, Ottawa (CA)

(73) Assignee: Alcatel Canada Inc., Ottawa, Ontario (CA)

(*) Notice: Subject to any disclaimer, the term of this patent is extended or adjusted under 35 U.S.C. 154(b) by 773 days.

(21) Appl. No.: 10/158,115

(22) Filed: May 31, 2002

(65) Prior Publication Data

US 2003/0226034 A1    Dec. 4, 2003

(51) Int. Cl.
*G06F 11/00* (2006.01)
*G06F 9/00* (2006.01)

(52) U.S. Cl. .......................... 726/22; 726/11
(58) Field of Classification Search .................. 726/22, 726/11
See application file for complete search history.

(56) References Cited

U.S. PATENT DOCUMENTS

| | | |
|---|---|---|
| 5,542,089 A | 7/1996 | Lindsay et al. |
| 5,958,053 A | 9/1999 | Denker ........................ 713/201 |
| 6,321,338 B1 | 11/2001 | Porras et al. ............... 713/201 |
| 6,597,661 B1* | 7/2003 | Bonn ........................ 370/235 |
| 6,725,378 B1* | 4/2004 | Schuba et al. ............... 713/201 |
| 6,779,033 B1* | 8/2004 | Watson et al. ............... 709/227 |
| 6,816,910 B1* | 11/2004 | Ricciulli ..................... 709/237 |
| 2001/0042200 A1* | 11/2001 | Lamberton et al. ......... 713/151 |
| 2002/0035683 A1* | 3/2002 | Kaashoek et al. .......... 713/154 |

FOREIGN PATENT DOCUMENTS

EP    1154610 A2    11/2001

OTHER PUBLICATIONS

"Analysis of a Denial of Service Attack on TCP", Christoph L. Schuba et al., 1997 IEEE, pp. 208-223.
"Detecting SYN Flooding Attacks", Haining Wang et al., 2002 IEEE.

* cited by examiner

Primary Examiner—Emmanuel L. Moise
Assistant Examiner—Ali S. Abyaneh
(74) Attorney, Agent, or Firm—Marks & Clerk

(57) ABSTRACT

Methods of preventing flooding-type denial-of-service attacks in a computer-based network are described. Connection establishing messages known as SYN packets are matched with connection terminating messages (FIN packets) by using a hash algorithm. The hash algorithm or message digest uses source and destination IP addresses, port numbers, and a secret key as input parameters. The SYN packets and FIN packets are mapped to buckets using the hash algorithm and statistics are maintained for each bucket. A correspondence between SYN packets and FIN packets is maintained to close a security hole.

15 Claims, 2 Drawing Sheets

SECRET HASHING FOR TCP SYN/FIN CORRESPONDENCE

FIELD OF THE INVENTION

This invention relates, generally, to computer based systems and more particularly to methods of detecting security related attacks in such systems.

BACKGROUND

Attacks on web sites in recent years has resulted in severe disruption in network services. These attacks can take any one of a number of forms including, but not limited to, SYN flooding.

In a SYN flooding attack an attacker overloads a victim's site to the point where it cannot cope with incoming traffic. Such an attack, typically, focuses on an inherent characteristic of TCP based services.

Essentially, TCP services rely on a three-way hand shaking protocol on connection set up. A client wishing to make connection with a host sends a synchronization signal (SYN) to the host and the host responds to the client with a SYN acknowledgement (ACK) reply. The client then returns an acknowledgement and the connection is established. The handshaking protocol is illustrated in FIG. 1.

Upon completion of a connection the client forwards a finish (FIN) packet to the host indicating that there will be no further data or packets directed to the host and the connection is thereafter closed.

In a SYN flooding attack the attacker will typically use a false or invalid source address such that when the host returns the SYN/ACK message it does not reach a valid client. Under the TCP protocol the host stores half opened connections i.e. connections for which the third leg of the three way protocol has not been completed for a set period of time or until a system time out occurs. If, during this time interval multiple new half opened connections are established at the host site the memory allocated to retaining such connections becomes swamped and eventually is unable to receive any more SYN packets. At this stage the server or host will crash or will not respond to any new connections and the site goes out of service. Because the host is unable to receive further data the attacker has been successful in generating what is known as a denial of service attack. Denial of service attacks have become an increasingly prevalent form of a security threat and the problem, so far, has been quite difficult to solve. Several countermeasures have been proposed and can be characterized as firewall and router filtering, operating system improvements, protocol improvements and intrusion detection.

Considerable prior art exists in the area of security attacks and the problem is well described in a publication by C. Schuba, I. Krsul, M. Kuhn, E. Spafford, A. Sundaram and D. Zamboni entitled "Analsyis of a denial of service attack on TCP", published in the Proc., 1997 IEEE Symp. Security and Privacy. The Schuba et al. paper describes the problem and the classical solutions for a proxy service: the TCP relay and the semitransparent TCP gateway. In those two solutions, a fire wall intercepts the TCP connections, maintains the states of the TCP state machine and introduces new packets to avoid the attacks.

The proxy solutions according to this publication have to maintain, for each connection, the states of the corresponding TCP state machine. This mechanism needs a lot of resources and can be itself the target of a new denial of service attack. Thus, the high cost of the computation overhead makes this solution inappropriate for network routers or switches.

A second prior art solution which is closer to the present invention is described by H. Wang, D. Zhang and K. G. Shin, "Detecting SYN flooding attacks", Proc. Infocom 2002. The method according to Wang et al. relies on a counting argument on the SYN and FIN packets on the TCP connections. Those packets should go in pairs in any well behaved connection. Thus, the number of SYN packets should match roughly the number of FIN packets. The simplicity of this method lies in the stateless and low computation overhead which makes the detection mechanism itself immune to flooding attacks. This simplicity allows the detection to be performed in the leaf routers that connect end hosts to the Internet.

The counter mechanism according to Wang et al. has a major drawback. If attackers know exactly the detection protocol described by this method they may thwart this approach simply by overflooding the routers with synchronized SYN and unrelated, over even invalid FIN packets. Hence the SYN counter and the FIN counter would be roughly the same. However, the victim's TCP/IP stack would be open to many half-opened connections that would not be closed by the invalid FIN packets. This corresponds to the original denial of service attack.

U.S. Pat. No. 6,321,338 which issued Nov. 20, 2001 to Porras et al. and entitled "Network Surveillance", also provides prior art for this technology. According to the Porras et al. patent there is provided a method of network surveillance including receiving network packets handled by a network entity and building at least one long term and at least one short term statistical profile from a measure of the network packets that monitors data transfers, errors or network connections. A comparison of the statistical profiles is used to determine whether the difference between the statistical profiles indicates suspicious network activity.

This patent further discloses, in addition to the details mentioned above, that intensity measures of event streams e.g. ICMP packets, are particularly suited for detecting flooding attacks. Furthermore, the patent discloses that intensity measures that correlate SYN to SYN_ACK messages, volume analysis of SYN/RST messages or TCP/FIN messages are useful to detect port availability or scanning attacks.

A second patent of interest is U.S. Pat. No. 5,958,053 which issued on Sep. 28, 1999 to Denker entitled "Communications protocol with improved security". According to the Denker patent the invention therein includes two new first level protocols and several embodiments of the second level protocol. The two new first level protocols of the invention include the TCP2B protocol and the TCP 2E protocol. In the TCP2B protocol both client and server indicate their support for this protocol using one or more bits in the TCP header. According to the TCP 2B protocol the client retransmits its requested options in the ACK message so the server need not store the options after the connection request. In the TCP 2E protocol the server maintains a Friends Table listing addresses of devices recently observed to complying with a TCP. If a client's address is on the Friends Table the connection request is processed according to TCP. Otherwise the server sends an acknowledge message to the client to prompt the client to send a reset (RST) message. The client's address can then be added to the Friends Table.

This patent discloses the use of a hashing function on the source and destination IP addresses and port numbers plus the secret key, known only to the server to differentiate SYN packets. Additionally, the patent discloses keeping a hash table that includes counters corresponding to respective clients to detect unsuccessful attempts as would occur with a SYN flood attack. Each counter is decremented after receiving a SYN message from its corresponding service and incremented when a successful connection is established between the client and the server upon the reception of the ACK from the client.

Denial of service of attacks often employ TCP setup SYN messages to flood target stacks with fake connection attempts. In order to detect such attacks a number of statistics-based heuristics have been developed which count SYN versus FIN messages and flag a skew as an attack. Unfortunately, the attacker can fool a number of these systems by flooding with as many FINs as SYNs but keeping the FINs unrelated to the SYNs.

This is detectable also if the detection system is willing to maintain a table of all SYNs and only counting those FINs which correspond to a valid SYN. Unfortunately, in high bandwidth applications it may not be possible to maintain such a large table of connections.

The solution provided by U.S. Pat. No. 5,958,053 just monitors the connections based on the IP addresses and report numbers. No global monitoring based only on the IP addresses is done.

The best prior art solutions known to the inventors observe traffic and accumulate statistics based on SYNs versus FINs, and flagging an attack if a discrepancy exists. There is not correspondence check between the outgoing SYNs and incoming FINs. This leaves a whole which is also exploitable by a savvy attacker since the attacker can flood a victim with SYN packets and non-corresponding FIN packets. The victim accumulates half-opened connections and the detector is fooled.

SUMMARY OF THE INVENTION

The present invention improves on the prior art by maintaining a correspondence between SYNs and FINs, closing the security hole.

The solution also provides a coherent way to deal with reset packets.

Generally, therefore, the present invention detects SYN flooding attacks by using a hashing function to map SYN messages to corresponding FIN messages.

Therefore, in accordance with a first aspect of the present invention there is provided a method of detecting an abnormal number of unsuccessful connection attempts at a router in a digital communications system, the method comprising the steps of: a) calculating, for each packet with connection flag set up (SYN and SYN/ACK) and for each connection terminating (FIN) packet received at the router during a predetermined time interval, a value using a hash function with source and destination IP addresses and port numbers and a key as input parameters; b) incrementing by one a global count and a bucket count identified uniquely by the value upon receiving a packet with connection flag set up (SYN and SYN/ACK); c) decrementing by one the global count and the bucket count upon receiving a connection termination (FIN) packet, only if these counts are strictly positive; and d) determining that an abnormal number of unsuccessful connections attempts have occurred responsive to the behavior of the global count over successive time intervals.

In accordance with a second aspect of the present invention there is provided a method of detecting an abnormal number of unsuccessful connection attempts at a router located between a LAN and a network in a digital communications system, the method comprising the steps of: a) calculating, for each connection establishing (SYN) and connection terminating (FIN) packet received at the router during a predetermined time interval, a value using a hash function with source and destination IP addresses and port numbers and a key as input parameters; b) incrementing by one a global count and a bucket count identified uniquely by the value upon receiving a connection establishing (SYN) packet from the LAN side of the router; c) decrementing by one the global count and the bucket count upon receiving a connection termination (FIN) packet from the network side of the router, only if these counts are strictly positive; and d) determining that an abnormal number of unsuccessful connections attempts have occurred responsive to the behavior of the global count over successive time intervals.

In accordance with a further aspect of the present invention there is provided a method of detecting an abnormal number of unsuccessful connection attempts at a router located between a LAN and a network in a digital communications system, the method comprising the steps of: a) calculating, for each connection establishing (SYN) and connection terminating (FIN) packet received at the router during a predetermined time interval, a value using a hash function with source and destination IP addresses and port numbers and a key as input parameters; b) incrementing by one a global count and a bucket count identified uniquely by the value upon receiving a connection establishing (SYN) packet from the network side of the router; c) decrementing by one the global count and the bucket count upon receiving a connection termination (FIN) packet from the LAN side of the router, only if these counts are strictly positive; and d) determining that an abnormal number of unsuccessful connections attempts have occurred responsive to the behavior of the global count over successive time intervals.

In accordance with a still further aspect of the present invention there is provided a method of detecting an abnormal number of unsuccessful connection attempts at a router located between a LAN and a network in a digital communications system, the method comprising the steps of: a) calculating, for each signaling packet (SYN, SYN/ACK, FIN, RST) received at the router during a predetermined time interval, a value using a hash function with source and destination IP addresses and port numbers and a key as input parameters; b) incrementing by one a specific bucket count for each packet type coming from the LAN side and from the network side of the router; c)maintaining global counts over all buckets of the counts defined in step b); and d) determining that an abnormal number of unsuccessful connections attempts have occurred responsive to the behavior of the global count over successive time intervals, wherein the bucket counts are reset at the end of the time interval.

BRIEF DESCRIPTION OF THE DRAWINGS

The invention will now be described in greater detail with reference to the attached drawings wherein.

DETAILED DESCRIPTION OF THE INVENTION

Figure 1:
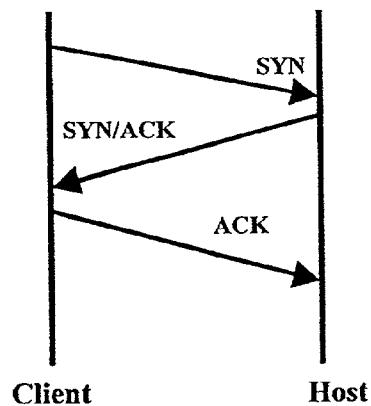
FIG. 1 illustrates the TCP initiating protocol.

FIG. 1 illustrates the TCP/IP protocol for initiating a connection from a client to a post or server. The client sends a connection initiating message (SYN) to the server who responds with a SYN/ACK message back to the client. The client returns an acknowledged message which fully opens the connection.

Upon completion of a session the client sends an FIN or connection terminating message to the host or server which acknowledges the message and the server returns an acknowledgement to formally close the connection.

As discussed previously if the third leg of the connection initiating message i.e. the acknowledgement from the client to the server is not received at the server the server maintains a record of a half-opened connection and a plurality of such half-opened messages can overwhelm the server which will lead to a crash and interruption of the service.

Figure 2:
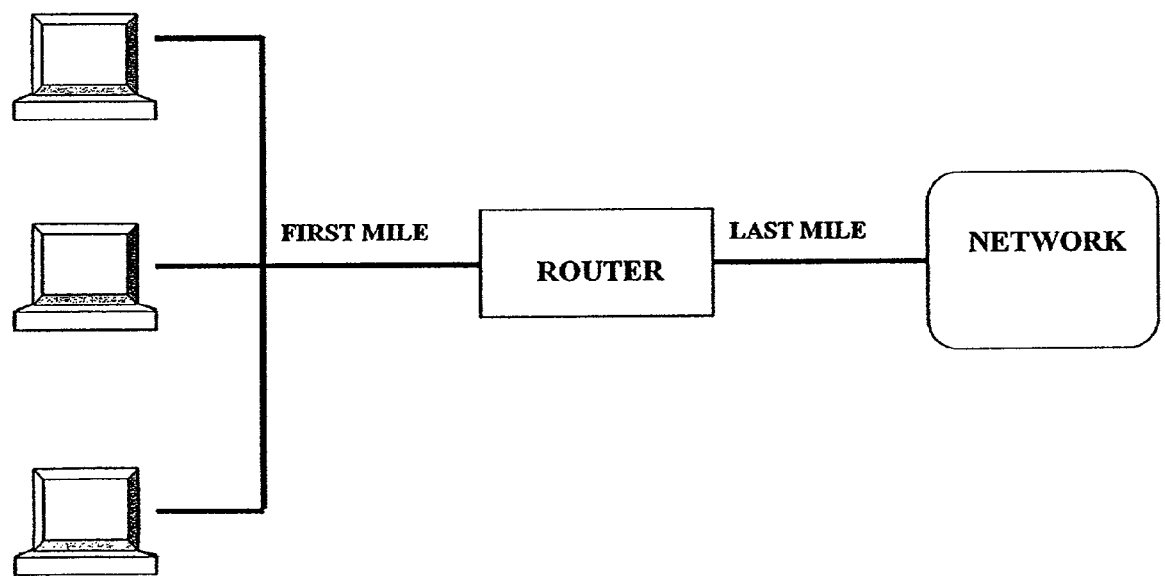
FIG. 2 is a high level illustration of an implementation of the present invention.

It is anticipated that the present invention will find particular application in a router at the edge of the Internet which provides access from a local area network to the Internet or network in general. It may also be used in a switch, a firewall, a host, etc. FIG. 2 is a high level diagram of this application showing the router which includes the mechanisms for carrying out the method of the present invention.

The SYN flood attacks can be detected efficiently by maintaining the states of connections with a hashing table. Such a system can be more efficient then other methods identified in the prior art. The associated hashing function must be collision resistant i.e. it must be computationally infeasible to find two couplets hashed in the same bucket. This can be achieved with a keyed function.

Therefore, in this invention, incoming signaling packets (SYN, SYN/ACK, FIN, RST) can be mapped to buckets by a secret hashing function and the statistics can be maintained on each bucket, rather than the entire system. A simple counter can be incremented on SYNs and decremented on FINs for each bucket. This way there can at least be a statistical correspondence between SYNs and FINs, and without knowledge of the mapping function, the attacker would have no way of faking the FINs to map to the same bucket (without corresponding to the same SYN). This relies on the assumption that an attacker has only two choices: either completing the three-way handshake and, eventually, the connection or not completing the three-way handshake and leaving the client with a half-open connection.

The mapping function could hash [source IP, destination IP, destination port, key] to n buckets. The choice of n is a trade-off between higher demands on the checker and effectiveness of the system. As an example, n=100 would risk too many statistical collisions under attack (i.e. the system might not detect the attack underway); $n=10^6$ would be much better in terms of collisions; however, its storage requirements might be too great for a small router (for example). In fact, any efficient data structures supporting insertion, membership queries and optionally, deletion could be used (e.g. Bloom-filter with keyed hashing functions). The main issue is to have an efficient data structure for which the false positive membership queries are very low. This is the reason why the size of the table is huge.

The key parameter allows the hashing algorithm to be known, but the correspondence between [IPs, port] and bucket to be hidden from the attacker. Thus, key would be a random number known only to the detection system.

A global counter would be maintained to track all open connections. It would be the heart of the logic that decides if an attack is underway.

Denial of service attacks have become an increasingly prevalent form of security threat and the problem appears to be quite difficult to solve because the attacks prey on intrinsic properties of the TCP/IP infrastructure. The present invention provides a means of detecting denial of service attacks that is more efficient and robust then known methods.

Thus, the invention is related to a method of detecting flooding type denial of service attacks in which the SYN messages are matched to the FIN messages by using a hash algorithm that includes use of a key for additional security. The method also relates to a method of accounting for corresponding reset messages and to maintain global counts of the SYN, FIN and reset messages whereby these counts would be used to further detect service attacks.

The invention relies on a method of measuring connection establishing packets (SYN) and connection terminating packets (FIN) received at the router during a predetermined time interval. Information in the packets such as source and destination IP addresses, port numbers and a key are used to calculate a value using a hash function. The global count and a bucket count, the bucket count being for a bucket identified by the value are incremented upon receiving a connection establishing packet. Upon receipt of a connection terminating packet, the global count and the bucket count, the bucket count being for the bucket identified by the value, are reduced by one if the global count and the bucket count are positive. The use of the bucket count allows connection terminating packets to be related to connection establishing packets, in that packets for a given connection will result in the same value being generated and hence the same bucket count being used. If the bucket count for a connection for which a connection terminating packet is received is not positive then there has likely been no corresponding connection establishing packet and the global count is not decremented. A denial of service attack indicated by an abnormal number of unsuccessful connection attempts is determined based on the behavior of the global count over successive time intervals.

The invention relies on a method of measuring connection establishing packets (SYN) and connection terminating packets (FIN) received at the router during a predetermined time interval. Information in the packets such as source and destination IP addresses, port numbers and a key are used to calculate a value using a hash function. The global count and bucket count are incremented upon receiving a connection establishing packet. If connection terminating packets or FIN packets relating to the global count and bucket count are positive the accounts are reduced by one. A denial of service attack indicated by an abnormal number of unsuccessful connection attempts is determined based on the behavior of the global count over successful time intervals.

Typically, the bucket counts are reset at the end of the time interval which will be either a continuous sliding window or a non-overlapping sliding window.

The method of determining a denial of service attack relies on using any one of a cumulative sum, a moving average or a filter derivative to detect changes in the global counter.

Figure 3:
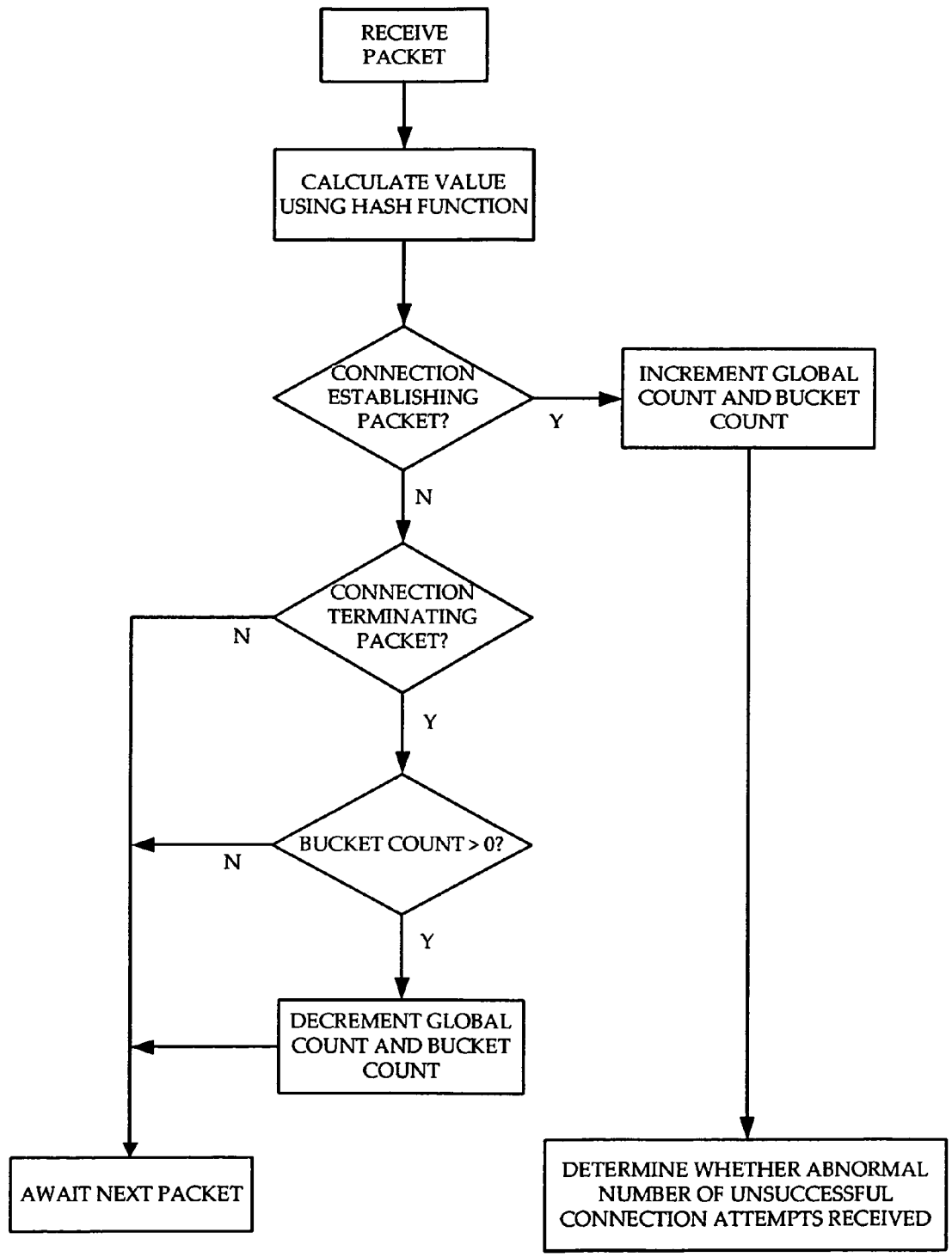
FIG. 3 is a flow diagram illustrating one implementation of the invention.

FIG. 3 is a flow diagram showing one embodiment of the invention.

In the previous discussion, huge hashing tables were used to assure few false positive answers to the membership queries. However, small hashing tables based on secret hashing functions are also useful if the traffic through the router is important. In this case, the hashing table is used to split the traffic into independent and non-predictable flows. In such a case, only bucket counters are used for the attack detections. Typically, the method described in paragraph [0043] above is applied for each bucket counter and not for the overall counter.

Although specific embodiments have been described and illustrated it would be apparent to one skilled in the art that numerous changes can be introduced without departing from the basic concept. It is to be understood, however, that such changes, to the extent possible, fall within the full scope of the invention as defined by the appended claims.

We claim:

1. A method of detecting a denial of service (DoS) attack at a router in a digital communications system, the method comprising the steps of:
   a) calculating, for each connection establishing and connection terminating packet received at the router, a value uniquely identifying a connection;
   b) incrementing by one during a predetermined time interval a global count and a bucket count of a bucket identified uniquely by the value upon receiving a connection establishing packet, wherein said global count uses any one of a cumulative sum, a moving average, or a filter derivative to detect open connections;
   c) decrementing by one during the predetermined time interval the global count and the bucket count of the bucket identified uniquely by the value upon receiving a connection terminating packet, only if the bucket count is strictly positive; and
   d) identifying a DoS attack using the global count by tracking unsuccessful connection attempts over successive time intervals.

2. The method as defined in claim 1 wherein the predetermined time interval is one of a continuous sliding window or a non-overlapping sliding window.

3. The method as defined in claim 2 wherein the bucket counter is reset at the end of the predetermined time interval.

4. The method as defined in claim 1 wherein said connection establishing packet is a SYN or a SYN/ACK packet and said connection terminating packet is a FIN packet.

5. A method according to claim 1 wherein said router is connected between a LAN and a network in said digital communication system, said connection establishing packet being received from the LAN side of the router and said connection terminating packet being received from the network side of the router.

6. A method according to claim 5 wherein said connection establishing packet is a SYN packet and said connection terminating packet is a FIN packet.

7. A method according to claim 1 wherein said router is located between a LAN and a network in said digital communication system, said connection establishing packet being received from the network side of the router and said connection terminating packet being received from the LAN side of the router.

8. A method according to claim 7 wherein said connection establishing packet is a SYN packet and said connection terminating packet is a FIN packet.

9. A method according to claim 1 wherein said value is determined using a hash function with inputs of source IP address, destination IP address, port number, and a key.

10. The method of claim 1 wherein said each value is determined by hashing the data representing the source IP address and the destination IP address of said connection establishing packet and connection terminating packet, and the port number on which said connection establishing packet and connection terminating packet are received.

11. The method of claim 1 wherein said values are maintained in a hash table that includes a plurality of buckets, each bucket maintaining a respective bucket count, and each bucket further being accessed for increasing or decreasing said respective bucket count using said key.

12. The method of claim 11 wherein each bucket is a Bloom filter.

13. The method of claim 11 wherein each bucket maintains at least one additional count for distinctly counting one or more of: the number of SYN packets received in said bucket, the number of RST packets received in said bucket, and the number of FIN packets deducted from said bucket.

14. A method of detecting a denial of service (DOS) attack at a router in a digital communications system, the method comprising the steps of:
   a) calculating at the router, for each connection establishing and connection terminating packet, a value using as input parameters source and destination IP addresses and port number of each said packet and a key;
   b) during a predetermined time interval, incrementing by one a bucket count in a bucket identified uniquely by the value upon receiving a connection establishing packet;
   c) during the predetermined time interval, decrementing by one the bucket count in the bucket identified uniquely by the value upon receiving a connection terminating packet if the bucket count is strictly positive;
   d) incrementing by one a global count in a global counter upon receiving each connection establishing packet and decrementing by one the global count upon transmitting each connection terminating packet for counting all open connections at said router, wherein said global count uses any one of a cumulative sum, a moving average, or a filter derivative to detect open connections.

15. A method according to claim 14 wherein said connection establishing packet is a SYN packet and said connection terminating packet is a FIN packet.

* * * * *